United States Patent [19]

Kaiser et al.

[11] Patent Number: 4,992,337
[45] Date of Patent: Feb. 12, 1991

[54] ELECTRIC ARC SPRAYING OF REACTIVE METALS

[75] Inventors: John J. Kaiser, Whitehall; Edward A. Hayduk, Jr., Blandon; Zbigniew Zurecki, Macungie; Robert B. Swan, Bath, all of Pa.

[73] Assignee: Air Products and Chemicals, Inc., Allentown, Pa.

[21] Appl. No.: 472,676

[22] Filed: Jan. 30, 1990

[51] Int. Cl.$^5$ .................. B32B 15/00; B23K 9/04
[52] U.S. Cl. .................. 428/642; 428/615; 428/649; 428/657; 428/658; 428/937; 219/76.16; 219/121.47
[58] Field of Search ............ 428/553, 937, 615, 642, 428/649, 657, 658, 656, 650, 681, 674, 457, 652, 680; 219/76.16, 121.47, 121.54, 121.55

[56] References Cited

U.S. PATENT DOCUMENTS

| | | | |
|---|---|---|---|
| 2,982,845 | 5/1961 | Yenni et al. | 219/76.16 |
| 3,088,196 | 5/1963 | Tour | 428/937 |
| 3,312,566 | 4/1967 | Winzeler et al. | 219/76.16 |
| 3,546,415 | 12/1970 | Marantz | 219/76 |
| 3,573,090 | 3/1971 | Peterson | 219/76.16 |
| 3,830,997 | 8/1974 | Essers et al. | 219/76.16 |
| 3,969,603 | 7/1976 | Boughton et al. | 219/121.54 |
| 4,023,006 | 5/1977 | West et al. | 219/121.55 |
| 4,162,389 | 5/1979 | Shimdeda et al. | 219/121.55 |
| 4,232,056 | 11/1980 | Grant et al. | 427/37 |
| 4,526,839 | 7/1985 | Herman et al. | 428/550 |
| 4,596,189 | 6/1986 | Halpern et al. | 101/458 |
| 4,788,402 | 11/1988 | Browning | 219/76.16 |

FOREIGN PATENT DOCUMENTS

62-114687 5/1987 Japan.
1440974 6/1976 United Kingdom ............ 219/76.16

OTHER PUBLICATIONS

H. D. Steffens, Dr. Ing., Electrochemical Studies of Cathodic Protection Against Corrosion by Means of Sprayed Coatings pp. 123–127.
S. Wiktorek, R. Ashbolt, Corrosion Preuention by Spray Metal Coatings, vol. 7, No. 4 (1982) pp. 9–15.
B. A. Shaw & P. J. Moran, Characterization of Corrosion Behavior of Zinc–Aluminum Thermal Spray Coatings, pp. 22–31.
P. O. Gartland, Cathodic Protection of Aluminum–Coated Steel in Seawater, Jun. 1987, pp. 29–36.
Thermal Spary Equipment and Supplies (TAFA) Issue B10122, TAFA arc Spray Aluminum Wire–01T.
Thermal Spray Equipment and Supplies (TAFA) Issue B10122, TAFA arc Spray Zinc Wire–02Z pp. 1–4.
Thermal Spray Equipment and Supplies (TAFA) Issue No. B10122, TAFALOY 02A Zinc/Aluminum Wire pp. 1–4.
H. Kayser, Spraying Under an Argon Atmosphere, pp. 243–250.

Primary Examiner—John J. Zimmerman
Attorney, Agent, or Firm—John M. Fernbacher; James C. Simmons; William F. Marsh

[57] ABSTRACT

An improved electric arc spray process for the deposition of reactive metals is disclosed which utilizes compressed inert gases for atomization. The improved process utilizes argon, nitrogen, carbon dioxide, sulfur hexafluoride, or mixtures thereof supplied to the arc spray gun such that the mass ratio of the wire feed rate to the gas feed rate is greater than 0.10. The process can be used to coat various substrates with metals or alloys comprising magnesium, zinc, lithium, and other reactive metals. The process is useful for the application of cathodic corrosion protective coatings on various substrates.

29 Claims, 1 Drawing Sheet

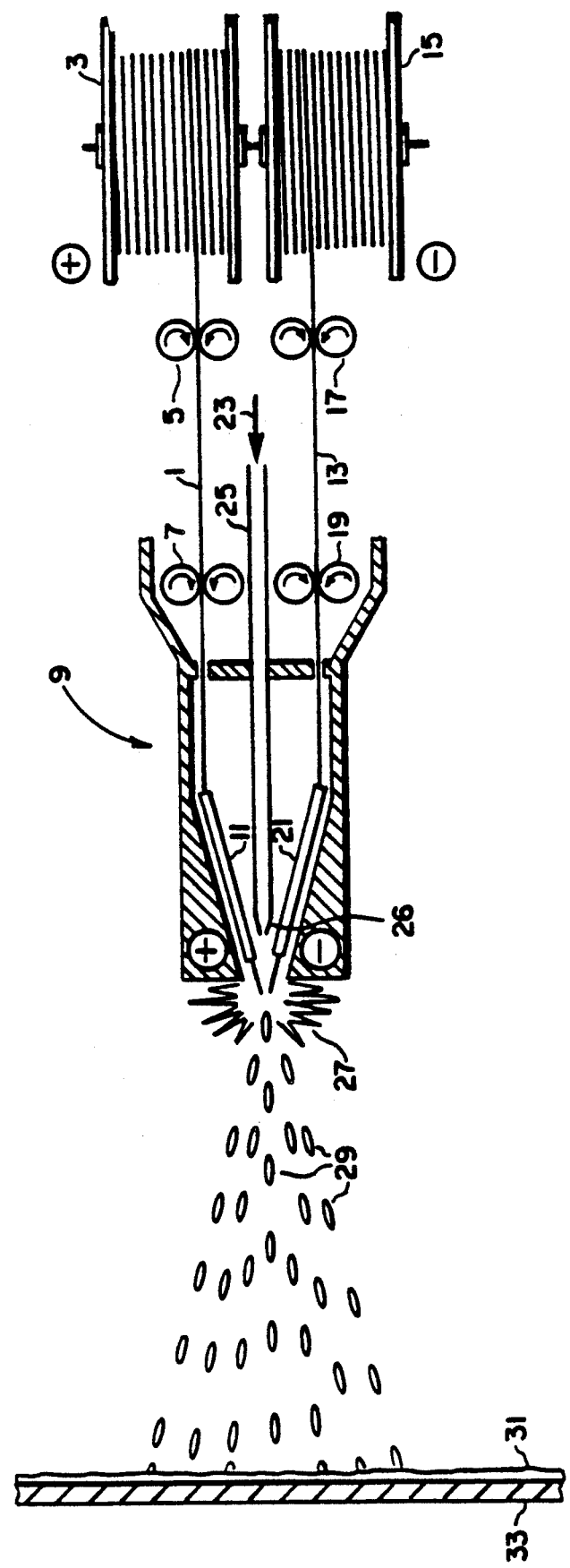

ELECTRIC ARC SPRAYING OF REACTIVE METALS

TECHNICAL FIELD

The present invention pertains to a thermal spray method for metal coating, and in particular to a process for the electric arc spraying of reactive metals using inert gases.

BACKGROUND OF THE INVENTION

The thermal spray coating of substrates with metals and metal alloys is a widely practiced method for protecting such substrates from corrosion or wear, or for introducing certain properties to the surface of such substrates. Thermal spray coating by the electric arc spray process is an efficient and economical method for applying protective layers to a wide variety of articles. Electric arc spray devices are well known in the art and a typical device is described in U.S. Pat. No. 3,546,415.

The application of corrosion resistant coatings of aluminum, zinc, aluminum-zinc alloys, and aluminum-magnesium alloys can be accomplished using the arc spray method. An article by H. D. Steffans entitled "Electrochemical Studies of Cathodic Protection Against Corrosion by Means of Sprayed Coatings" in *Proceedings 7th International Metal Spraying Conference* (1974) at p. 123 describes the arc spray application and corrosion testing of zinc, aluminum, and zinc-aluminum psuedo-alloy coatings. A review article entitled "Corrosion Prevention by Sprayed Metal Coatings" by S. Wiktorek and R. Ashbolt in *Corrosion Australasia* Vol 7, No.4 (1982) at p.9 summarizes the then state of the art in the field, and describes typical process conditions for electric arc spraying including the use of air as the usual atomizing and carrier gas in the arc spray gun. B. A. Shaw and P. J. Moran, in an article entitled "Characterization of the Corrosion Behavior of Zinc-Aluminum Thermal Spray Coatings" in *Materials Performance* November 1985 at p.22 discuss the arc spraying of aluminum and zinc wires of different diameters to form a pseudo-alloy coating of about 85 wt % zinc-15 wt % aluminum, and review the physical and corrosion properties of the coating. An article by P. O. Gartland entitled "Cathodic Protection of Aluminum-Coated Steel in Seawater" in *Materials Performance* June 1987 at p. 29 reviews the arc spray coating of steel with aluminum-5 wt % magnesium and the performance of the coating in seawater.

Detailed information on the equipment and operating conditions for arc spraying of aluminum, zinc, and aluminum-zinc alloys is given in a series of Technical Data bulletins published by TAFA Incorporated, a major supplier of thermal spray equipment and supplies. Technical Data bulletin 1.9.1.2-01T (1986) gives such information on arc spraying of aluminum wire. Technical Data bulletin 1.9.1.2-02Z (1986) gives such information on arc spraying of zinc wire, and recommends the use of air as the atomizing gas at pressures between 45 and 70 psig. Technical Data bulletin 1.9.1.2-02A (1986) gives detailed information on arc spraying of zinc-aluminum wire, and recommends the use of air as the atomizing gas at pressures between 45 and 70 psig.

While air has been the most widely used atomizing gas for electric arc spraying, the use of inert gas for this purpose has been described in several applications. An article by H. Kayser in *Thin Solid Films* Vol. 39 (1976) at p.243 describes an arc spraying facility including an enclosure 7×13×3 meters high purged with argon and an argon-driven arc spray gun used therein for the spraying of titanium, tantalum, niobium, tungsten, and molybdenum. U.S. Pat. No. 4,232,056 discloses the arc spray coating of titanium and stainless steel with aluminum to produce porous surfaces for use in boiling heat transfer. Nitrogen, argon, and mixtures thereof can be used as atomizing gas in the arc spray gun. The use of nitrogen atomizing gas and an arc gun current of 85 amperes are specifically disclosed for applying the first coat of a two-coat layer of aluminum on stainless steel. U.S. Pat. Nos. 4,526,839 and 4,596,189 describe the arc spray application of aluminum, zinc, tin, copper, nickel, or their alloys to various substrates to form lithographic printing plates. Air, nitrogen, and ammonia are described as possible atomizing gases to be used at pressures between 40 and 120 psig. The reference states that it is preferred to use air at 80 psig to drive the arc spray gun.

The arc spraying of reactive metals using air as the atomizing gas can be inefficient, uneconomical, or unacceptable when the reactive metals are oxidized or vaporized to any substantial extent during spraying and when the resulting deposited coating has altered chemical composition and properties. When inert gases are substituted for air for atomization in arc spray guns, air from the surrounding atmosphere can be entrained to contact the stream of sprayed metal and cause excessive metal oxidation if proper arc spray gun operating conditions are not used. Optimum operating conditions for the inert gas arc spraying of such reactive metals are not known in the art, but are disclosed in the invention described below.

SUMMARY OF THE INVENTION

The invention is a method for applying a metallic coating to a substrate by electric arc spraying in which an electric arc is formed between two metallic wires in an electric arc spray gun, in which at least one of the wires contains one or more reactive metals, thus melting the wires, and directing pressurized inert gas across the arc to form molten metal droplets and propel the droplets onto the substrate to solidify and form the metallic coating. The inert gas flow rate and wire feed rate are controlled such that the mass ratio of the feed rate of the wires into the arc to the feed rate of the inert gas is greater than 0.10. The reactive metal is selected from magnesium, zinc, lithium, bismuth, cadmium, calcium, sodium, and mixtures thereof, and the inert gas is selected from argon, nitrogen, carbon dioxide, sulfur hexafluoride, and mixtures thereof. The use of inert gas shields the metal droplets from air and minimizes oxidation and vaporization of the reactive metal, and the use of inert gas in place of air allows a higher mass feed rate of wire through the gun at constant gun power.

BRIEF DESCRIPTION OF THE DRAWING

The single drawing is a schematic of a typical electric arc spray gun which can be used in the process of the present invention.

DETAILED DESCRIPTION OF THE INVENTION

An electric arc spray gun representative of arc spray guns used in the metal coating field is shown in the Drawing. Wire 1 typically between 1/32" and 1/16" in diameter is fed from reel 3 by friction drive wire feeders 5 and 7 into gun tip 9 and through insulated wire guide 11. Wire 13, which can be of the same or different composition as wire 1, is fed from reel 15 by friction drive wire feeders 17 and 19 through insulated wire guide 21. An electric arc 27 is struck across the ends of wires 1 and 13 which are energized to form positive and negative electrodes respectively. The wire is fed to the gun by a wire feed system such as a welding wire feed system known in the art, and power for the arc is provided by a known welding power supply system. Compressed inert gas stream 23 is supplied to atomizing gas feed tube 25, expands across nozzle 26, and passes through arc 27 in which wires 1 and 13 are melted to form molten metal. The jet of expanding gas from nozzle 26 atomizes the molten metal to form droplets 29 which are propelled in a stream and deposited to form coating 31 on substrate 33. This arc spray process is well known and an arc spray gun such as that described in U.S. Pat. No. 3,546,415 is typical of arc spray guns used in the process.

Compressed gas stream 23 is compressed air in most arc spray applications. When wires 1 and/or 13 contain reactive metals (defined herein as easily oxidized metals with high vapor pressures at arc spray conditions) such as magnesium, zinc, lithium, bismuth, cadmium, calcium, and sodium, metal droplets 29 can be oxidized and vaporized during the time of flight to substrate 33 and before solidification in coating 31 if air is used for the atomization gas. This results in loss of the reactive metal as oxides which form dust or fumes, and the formation of metal vapor which can condense away from the substrate. In some applications, for example when the reactive metal is applied as coating 31 to protect substrate 33 from corrosion, it is desirable to minimize the extent of oxidation so that the amount and concentration of reactive metal in coating 31 is maximized. The direct substitution of inert gas for air to feed tube 25 for atomization of the molten metal will not necessarily eliminate the oxidation and vaporization problems when the arc spray gun is operated in a normal surrounding atmosphere of air. Depending upon the operating parameters of the spray gun, a certain amount of air will be entrained into the jet of expanded inert gas as the molten metal droplets are propelled towards substrate 33, and oxidation and vaporization of the reactive metal will occur to some extent. It is desirable to minimize this oxidation and vaporization by the selection of appropriate operating parameters for the arc spray gun. The selection of such appropriate operating parameters for spraying reactive metals is not possible based upon the present state of the art in the arc spray field described earlier.

The mechanism by which such reactive metals are lost by oxidation and vaporization during arc spraying in a surrounding air atmosphere when inert gas is used for atomization is not well understood; however, the size, temperature, and velocity of molten metal droplets in flight from the arc spray gun to the substrate are thought to be important factors affecting such losses. It has been found in the present invention that losses of such reactive metals during arc spraying in a surrounding air atmosphere can be minimized by using inert gas selected from argon, nitrogen, carbon dioxide, sulfur hexafluoride, and mixtures thereof for atomization, for example as delivered through the arc spray gun atomizing gas feed tube 25. The inert gas feed rate and the arc gun wire feed rate should be controlled such that the metal to gas ratio, defined as the mass ratio of the feed rate of the wires into the arc to the feed rate of the inert gas, is greater than 0.10. This can be achieved in commercially available arc spray guns by supplying the atomization gas at pressures of less than about 40 psig, preferably between about 15 and 40 psig. This pressure range is lower than the usual range of 45 to 70 psig utilized in prior art electric arc spraying of reactive metals such as zinc using air as the atomizing gas. This pressure range is also lower than the range of 40 to 120 psig disclosed in the prior art for arc spraying of aluminum, zinc, nickel, and alloys thereof using nitrogen for atomization. Prior art metal to gas ratios are below 0.10; for example, in earlier-cited TAFA Technical Bulletin 1.9.1.2-01T the ratio is 0.077, and the ratio as calculated from data in earlier-cited U.S. Pat. No. 4,232,056 is 0.024.

It has been found that a voltage of less than about 30 volts, preferably between 20 and 28 volts, should be applied to the arc gun for most efficient operation. In particular, a minimum voltage in this range should be selected which is just high enough to eliminate arc instability and spitting during operation of the spray gun. A current of greater than about 300 amperes normally should be supplied to the gun for the most efficient operation. It also has been found that the distance from the tip of the spray gun to the substrate, known as the standoff distance, has no significant effect on the loss of the reactive metals being sprayed when this distance is between 2 and 6 inches. A standoff distance between 3 and 6 inches is preferred.

The invention also can be used to spray less reactive metals such as aluminum, iron, copper, nickel, and alloys thereof. These metals are less reactive and have lower vapor pressures than the reactive metals earlier described, but are subject to some degree of oxidation during arc spraying with air or with inert gases at less than optimum conditions. Thus the invention can be utilized by operating the arc spray gun in one of the following three modes: (1) with two wires each containing the reactive metals earlier described; (2) with two wires each containing only the less reactive metals described above; or (3) with one wire containing reactive metals and one wire containing only the less reactive metals.

The invention is also a metal coated substrate comprising a substrate and a coating applied by the process described above. The coating can contain the reactive metals, the less reactive metals, or a combination of the reactive and less reactive metals earlier described.

The invention can be carried out using commercially available arc spray guns in the usual surrounding atmosphere of air. Typical examples of such spray guns include Model 8830 manufactured by TAFA, Inc. of Concord, N.H. and Type 4RG supplied by Metco, Inc. of Westbury, N.Y. Commercially available wire such as that supplied by TAFA, Inc. and other suppliers is appropriate for use in these guns at the operating conditions of the present invention. A wide range of substrates can be coated using the arc spray process of the present invention including steel, galvanized steel, aluminized steel, aluminum, aluminum alloys, copper, copper alloys, ceramic material, polymeric material, and paper.

The process of the present invention is especially useful in coating substrates such as steel for protection against corrosion in aqueous environments. Metals such as magnesium, zinc, and their alloys are widely used for the cathodic protection of water heaters and other process equipment, structures in marine environments, and ships. The application of these cathodically protective metals to the surfaces of such equipment using the present invention is economical and efficient, and the amount of cathodic metal deposited relative to that supplied to the arc spray gun is much higher than that of the conventional air-driven arc spray process.

EXAMPLE 1

A series of exploratory experiments was carried out to compare arc spray performance using air and several inert gases. Low carbon steel plates 3x4 inches in dimension were grit blasted and mounted vertically in front of a TAFA Model 8830 arc spray gun loaded with Alloy 5356 aluminum alloy wire with a nominal magnesium content of 4.9 wt %. A ⅜ inch orifice nozzle cap and a short cross nozzle positioner were used on the gun. For each coating run, a wire feed rate of 420 inches per minute and a gun horizontal traverse rate of 120 inches per minute were used. Voltage was set for each run at a level just high enough to avoid arc instability and spitting and was generally between 27.5 and 30 volts. Current was not actually set, but was determined by wire type, wire rate, voltage, gas type, and gas feed rate. The standoff distance was 6 inches. The gun was moved horizontally across each plate five times in alternating directions. At the end of each run, the coated plate was weighed and analyzed for magnesium content. Analysis was accomplished by coating the samples with a thin film of carbon using a vacuum evaporator and then performing elemental analysis using Energy Dispersive X-ray Spectroscopy (EDS) techniques in a JEOL JSM-840A scanning microscope equipped with a Kevex-Super 8000 EDS system interfaced to a Quantum detector. Table 1 summarizes the results of these runs.

TABLE 1

Aluminum-Magnesium Arc Spray Test Results (Example 1)

| Atomizing Gas | | Voltage, | Current, | Wt % Mg |
|---|---|---|---|---|
| Type | Pressure, psig | (Volts) | (Amperes) | In Coating |
| Air | 63 | 27.5 | 300 | 1.01 |
| $N_2$ | 20 | 27.5 | 235 | 2.58 |
| $N_2$ | 25 | 28.0 | 240 | 1.18 |
| $N_2$ | 30 | 28.5 | 240 | 0.91 |
| $N_2$ | 39 | 28.5 | 250 | 1.33 |
| $N_2$ | 49 | 28.5 | 250 | 0.99 |
| $N_2$ | 67 | 28.0 | 250 | 1.03 |
| 75% $N_2$-25% $CO_2$ | 62 | 30.0 | 300 | 1.38 |
| $CO_2$ | 25 | 27.5 | 230 | 2.84 |
| $CO_2$ | 30 | 27.5 | 235 | 3.22 |
| $CO_2$ | 40 | 28.5 | 245 | 2.20 |

TABLE 1-continued

Aluminum-Magnesium Arc Spray Test Results (Example 1)

| Atomizing Gas | | Voltage, | Current, | Wt % Mg |
|---|---|---|---|---|
| Type | Pressure, psig | (Volts) | (Amperes) | In Coating |
| $CO_2$ | 67 | 28.5 | 250 | 1.24 |

The results indicate that when air is used as the atomizing gas at typical arc spray conditions, a significant amount of magnesium is lost as shown by the fact that the deposited coating contained only 1.01 wt % magnesium compared with the wire having a nominal magnesium content of 4.9 wt %. The results also show that direct substitution of nitrogen, a nitrogen-$CO_2$ mixture, or $CO_2$ for air at similar arc gun operating conditions between 62-67 psig gas supply pressure and a current of 240-300 amperes does not have a significant effect upon the wt % magnesium in the coating. Because of the analytical procedures used for these exploratory experiments, differences less than about 0.5 wt % among data points are not significant. The results further show that retention of magnesium in the sprayed coating is improved for nitrogen at these gun current levels at gas pressures below 25 psig. When $CO_2$ is used, the magnesium retention improves markedly below 40 psig. In addition, these results reveal unexpectedly that the type of inert gas used at similar operating conditions affects the amount of magnesium retained in the deposited coating. While the exact mechanism by which the inert gas reduces reactive magnesium loss during spraying is not understood, it appears that the type of gas used can affect the amount of metal lost due to oxidation and vaporization by influencing the temperature and size of the molten metal droplets during detachment from the wire tips. Gases with higher specific heat capacities or other heat transfer properties could yield lower droplet temperatures which in turn would reduce vaporization.

EXAMPLE 2

A second series of experiments was performed to investigate other inert gases and the effect of atomizing gas pressure and standoff distance on the retention of magnesium at lower gas pressures and higher arc currents. The experiments were carried out using similar procedures and equipment as in Example 1. The wire, as analyzed by Inductively Coupled Plasma (ICP) spectroscopy, contained 4.39 wt % magnesium. Samples of the deposited coating from each run also were analyzed by this method, which is more accurate and reproducable than the analytical method used in Example 1. A summary of the conditions and results of these experiments for Example 2 is given in Table 2.

TABLE 2

Aluminum-Magnesiun Arc Spray Test Results (Example 2)

| Atomizing Gas | | Voltage, | Current, | Standoff Dist., | Wt. % Mg |
|---|---|---|---|---|---|
| Type | P. psig | (volts) | (Amperes) | (Inches) | in Coating |
| Nitrogen | 25 | 28 | 350 | 6.0 | 2.51 |
| Nitrogen | 25 | 28 | 350 | 6.0 | 2.33 |
| Nitrogen | 25 | 23 | 300 | 6.0 | 3.05 |
| Nitrogen | 25 | 23 | 300 | 3.5 | 2.98 |
| Nitrogen | 25 | 23 | 300 | 2.0 | 3.05 |
| Nitrogen | 15 | 23 | 300 | 4.5 | 3.99 |
| Argon | 15 | 27 | 300 | 4.5 | 4.29 |
| $N_2$-20% $CO_2$ | 15 | 22 | 300 | 4.5 | 3.63 |
| $N_2$-50% $CO_2$ | 19 | 25 | 300 | 4.5 | 2.91 |

TABLE 2-continued

| Aluminum-Magnesiun Arc Spray Test Results (Example 2) | | | | | |
|---|---|---|---|---|---|
| Atomizing Gas | | Voltage, | Current, | Standoff Dist., | Wt. % Mg |
| Type | P. psig | (volts) | (Amperes) | (Inches) | in Coating |
| $CO_2$-10% $SF_6$ | 19 | 25 | 300 | 4.5 | 3.46 |

The results from this series of experiments indicate that for arc spraying with inert gas atomization it is preferred to operate at voltages as low as possible while still maintaining stable arc operation, and at atomizing gas pressures (and thus gas flow rates) as low as possible while still achieving adequate atomization. For the inert gases used in these experiments, the minimum voltage is between 22 and 28 volts and the preferred atomizing gas pressure is between 15 and 40 psig. The metal to gas ratio for the argon run was 0.41, well above the preferred minimum of 0.10. It was found that standoff distance has no effect on process performance at distances between 2 and 6 inches. The magnesium contents of the coatings in this series of experiments are significantly higher than those observed in Example 1.

EXAMPLE 3

A third series of experiments was carried out to investigate the deposit rates and deposit efficiencies during arc spray coating using air, argon, and nitrogen at identical spray gun parameters and gas supply pressures. Carbon steel plates 8 × 12 inches in dimensions were grit blasted and mounted in turn at a standoff distance of 4.5 inches from a TAFA Model 8830 gun having a nozzle cap orifice diameter of ⅜ inch and a long cross positioner, and which was supplied with Type 5356 aluminum alloy wire containing 4.39 wt % magnesium as used in Example 2. 38 successive passes in 60 seconds were made in alternating horizontal directions on each plate at process conditions of 300 amperes, 25 volts, 300 inches/min traverse speed, and a gas supply pressure of 50 psig. Wire was automatically fed at a rate sufficient to control the current at 300 amperes. The corresponding gas flow rates were 45, 26, and 44 SCFM for nitrogen, argon, and air respectively. The amount of metal sprayed was determined by weighing the wire supply reels before and after each run. The plates were weighed to determine the coating weight for each run. Results of these runs are summarized in Table 3, in which coating efficiency is defined as the weight of the coating divided by the weight of wire consumed in each run.

TABLE 3

| Aluminum-Magnesium Arc Spray Test Results (Example 3) | | | | | | |
|---|---|---|---|---|---|---|
| Atomizing Gas | | Wire | Deposit | Deposit Effi- | Metal to Coating | |
| Type | Rate, Lb/hr | Rate, lb/hr | Rate, Lb/hr | ciency, % | Gas Ratio | Temp., °F. |
| Nitrogen | 196 | 21.2 | 16.7 | 78.9 | 0.108 | 700 |
| Argon | 161 | 25.3 | 21.1 | 83.4 | 0.157 | 700 |
| Air | 197 | 15.2 | 10.2 | 67.0 | 0.077 | 743 |

This series of experiments demonstrates the unexpected result that at a constant set of spray gun parameters including a constant gas supply pressure, more wire can be sprayed per unit time with nitrogen than with air, and still more with argon than with nitrogen. The use of these two inert gases apparently affects the electrical and thermal properties of the arc such that more wire can be fed to the arc to maintain a given arc current at a constant voltage and gas supply pressure. The metal to gas ratio, which is the wire mass feed rate divided by the gas mass feed rate, is above the preferred minimum of 0.10 for the nitrogen and argon runs, while for the air run the ratio is below this minimum value. The deposit temperature at the end of each run was lower for the inert gas runs than for air, which suggests lower droplet temperatures during flight from gun to surface, which in turn would decrease vaporization losses of the reactive metal. Thus the use of inert gas will allow higher productivity in the arc spray process than with the use of air. In addition, the results show that less magnesium is lost to oxidation and vaporization when inert gas is used instead of air, resulting in a higher deposit efficiency. The overall productivity increase in the arc spray process using inert gas instead of air is realized therefore by the ability to spray more metal at given gun conditions as well as by reduced losses of the reactive metal component.

The process of the present invention is useful for spraying reactive metals or alloys including metals other than those specifically disclosed herein, and a wide range of substrates in addition to those disclosed herein can be coated by the process of the present invention. The arc spray parameters preferred in the present invention, particularly the use of the disclosed inert gases at metal to gas ratios above 0.10 and at gas supply pressures below about 40 psig, are unique compared with prior art processes, and allow improved efficiency and productivity in the arc spraying of reactive metals for a wide variety of applications.

We claim:

1. A method for applying a metallic coating to a substrate by electric arc spraying comprising:
   (a) forming an electric arc between two metallic wires in an electric arc spray gun, at least one of said wires comprising one or more reactive metals, thereby causing said wires to melt; and
   (b) directing pressurized inert gas across said arc to form molten metal droplets and propel said droplets onto said substrate to solidify and form said metallic coating, wherein the mass ratio of the feed rate of said wires into said arc to the feed rate of said inert gas is greater than 0.10; whereby the use of said inert gas shields said molten metal droplets from air and minimizes oxidation and vaporization of said reactive metal, and whereby the use of said inert gas in place of air allows a higher mass feed rate of said metallic wires through said gun at a constant gun power.

2. The method of claim 1 wherein said reactive metal is selected from the group consisting of magnesium, zinc, lithium, bismuth, cadmium, calcium, sodium, and mixtures thereof.

3. The method of claim 1 wherein at least one of said wires comprises a metal selected from the group consisting of aluminum, iron, copper, nickel, and alloys thereof.

4. The method of claim 1 wherein said inert gas is selected from the group consisting of argon, nitrogen, carbon dioxide, sulfur hexafluoride, and mixtures thereof.

5. The method of claim 1 wherein the pressure of said inert gas is less than about 40 psig.

6. The method of claim 1 wherein the pressure of said inert gas is between about 15 psig and 40 psig.

7. The method of claim 1 wherein the voltage across said arc is less than about 30 volts.

8. The method of claim 1 wherein the voltage across said arc is between about 20 and 28 volts.

9. The method of claim 1 wherein said substrate is selected from the group consisting of steel, galvanized steel, aluminized steel, aluminum, aluminum alloys, copper, copper alloys, ceramic material, polymeric material, and paper.

10. A metal coated substrate comprising a substrate and a metallic coating on at least one surface thereof, said metallic coating being formed by:
   (a) forming an electric arc between two metallic wires in an electric arc spray gun, at least one of said wires comprising one or more reactive metals, thereby causing said wires to melt; and
   (b) directing pressurized inert gas across said arc to form molten metal droplets and propel said droplets onto said substrate to solidify and form said metallic coating, wherein the mass ratio of the feed rate of said wires into said arc to the feed rate of said inert gas is greater than 0.10;
whereby the use of said inert gas shields said molten metal droplets from air and minimizes oxidation and vaporization of said reactive metal, and whereby the use of said inert gas in place of air allows a higher mass feed rate of said metallic wires through said gun at a constant gun power.

11. The metal coated substrate of claim 10 wherein said reactive metal is selected from the group consisting of magnesium, zinc, lithium, bismuth, cadmium, calcium, sodium, and mixtures thereof.

12. The metal coated substrate of claim 10 wherein at least one of said wires comprises a metal selected from the group consisting of aluminum, iron, copper, nickel, and alloys thereof.

13. The metal coated substrate of claim 10 wherein the pressure of said inert gas is less than about 40 psig.

14. The metal coated substrate of claim 10 wherein the pressure of said inert gas is between about 15 psig and about 40 psig.

15. The metal coated substrate of claim 10 wherein the voltage across said arc is less than about 30 volts.

16. The metal coated substrate of claim 10 wherein said substrate is selected from the group consisting of steel, galvanized steel, aluminized steel, aluminum, aluminum alloys, copper, copper alloys, ceramic material, polymeric material, and paper.

17. The metal coated substrate of claim 10 wherein said metallic coating provides cathodic corrosion protection for said substrate.

18. A method for applying a metallic coating to a substrate by electric arc spraying comprising:
   (a) forming an electric arc between two metallic wires in an electric arc spray gun, at least one of said wires comprising one or more less reactive metals, thereby causing said wires to melt; and
   (b) directing pressurized inert gas across said arc to form molten metal droplets and propel said droplets onto said substrate to solidify and form said metallic coating, wherein the mass ratio of the feed rate of said wires into said arc to the feed rate of said inert gas is greater than 0.10;
whereby the use of said inert gas shields said molten metal droplets from air and minimizes oxidation and vaporization of said less reactive metal, and whereby the use of said inert gas in place of air allows a higher mass feed rate of said metallic wires through said gun at a constant gun power.

19. The method of claim 18 wherein said less reactive metal is selected from the group consisting of aluminum, iron, copper, nickel, and alloys thereof.

20. The method of claim 18 wherein said inert gas is selected from the group consisting of argon, nitrogen, carbon dioxide, sulfur hexafluoride, and mixtures thereof.

21. The method of claim 18 wherein the pressure of said compressed inert gas is between about 15 psig and 40 psig.

22. The method of claim 18 wherein the voltage across said arc is less than about 30 volts.

23. The method of claim 18 wherein said substrate is selected from the group consisting of steel, galvanized steel, aluminized steel, aluminum, aluminum alloys, copper, copper alloys, ceramic material, polymeric material, and paper.

24. A metal coated substrate comprising a substrate and a metallic coating on at least one surface thereof, said metallic coating being formed by:
   (a) forming an electric arc between two metallic wires in an electric arc spray gun, at least one of said wires comprising one or more less reactive metals, thereby causing said wires to melt; and
   (b) directing pressurized inert gas across said arc to form molten metal droplets and propel said droplets onto said substrate to solidify and form said metallic coating, wherein the mass ratio of the feed rate of said wires into said arc to the feed rate of said inert gas is greater than 0.10;
whereby the use of said pressurized inert gas shields said molten metal droplets from air and minimizes oxidation and vaporization of said less reactive metal, and whereby the use of said pressurized inert gas in place of pressurized air allows a higher mass feed rate of said metallic wires through said gun at a constant gun power.

25. The metal coated substrate of claim 24 wherein said less reactive metal is selected from the group consisting of aluminum, iron, copper, nickel, and alloys thereof;

26. The metal coated substrate of claim 24 wherein said inert gas is selected from the group consisting of argon, nitrogen, carbon dioxide, sulfur hexafluoride, and mixtures thereof.

27. The metal coated substrate of claim 24 wherein the pressure of said compressed inert gas is between about 15 psig and 40 psig.

28. The metal coated substrate of claim 24 wherein the voltage across said arc is less than about 30 volts.

29. The metal coated substrate of claim 24 wherein said substrate is selected from the group consisting of steel, galvanized steel, aluminized steel, aluminum, aluminum alloys, copper, copper alloys, ceramic material, polymeric material, and paper.

* * * * *